(12) United States Patent
Liu et al.

(10) Patent No.: US 10,360,656 B2
(45) Date of Patent: Jul. 23, 2019

(54) IMAGE DISPLAYING SYSTEM AND IMAGE DISPLAYING METHOD APPLIED THERETO

(71) Applicant: FLYTECH TECHNOLOGY CO., LTD, Taipei (TW)

(72) Inventors: Yun-Ping Liu, Taipei (TW); Chih-Yuan Liu, Taipei (CN)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 57 days.

(21) Appl. No.: 15/791,894

(22) Filed: Oct. 24, 2017

(65) Prior Publication Data
US 2019/0043163 A1 Feb. 7, 2019

(30) Foreign Application Priority Data
Aug. 4, 2017 (TW) .............................. 106126390 A

(51) Int. Cl.
*G06T 3/20* (2006.01)
*G09G 3/36* (2006.01)
*G02F 1/1333* (2006.01)
*G06T 3/40* (2006.01)

(52) U.S. Cl.
CPC ................ *G06T 3/20* (2013.01); *G09G 3/36* (2013.01); *G02F 1/13338* (2013.01); *G02F 2001/133397* (2013.01); *G06T 3/40* (2013.01); *G09G 2310/08* (2013.01); *G09G 2320/0204* (2013.01); *G09G 2320/0257* (2013.01); *G09G 2320/046* (2013.01); *G09G 2320/08* (2013.01); *G09G 2340/0407* (2013.01); *G09G 2340/0464* (2013.01); *G09G 2354/00* (2013.01)

(58) Field of Classification Search
CPC ... G06T 3/20; G06T 3/40; G09G 3/36; G09G 2310/08; G02F 1/13338; G02F 2001/133397
See application file for complete search history.

(56) References Cited

U.S. PATENT DOCUMENTS

| | | | |
|---|---|---|---|
| 6,959,339 B1 * | 10/2005 | Wu ...................... | G06F 16/9577 709/246 |
| 2003/0112259 A1 * | 6/2003 | Kinjo ................. | H04N 1/00307 715/700 |
| 2010/0053429 A1 * | 3/2010 | Miyazaki ............. | H04N 7/0132 348/513 |
| 2010/0085477 A1 * | 4/2010 | Ooishi ................. | G09G 3/3406 348/448 |

(Continued)

*Primary Examiner* — Sarah Lhymn
(74) *Attorney, Agent, or Firm* — WPAT, PC

(57) ABSTRACT

An image displaying system and an image displaying method are provided. The image displaying system includes a liquid crystal screen with a display area. Firstly, an original frame corresponding to an image signal is shown on the display area at a first time point. Then, an adjusted image is shown on the display area at a second point according to a setting information. The adjusted image and the original frame have different contents. Then, the adjusted image is not shown but the original frame is shown on the display area at a third time point. The time difference between the third time point and the first time point is not larger than a response time period corresponding to the human persistence of vision. Consequently, the image sticking problem or an image retention phenomenon of the liquid crystal displaying technology is overcome.

19 Claims, 4 Drawing Sheets

(56) References Cited

U.S. PATENT DOCUMENTS

2011/0025910 A1\* 2/2011 Furukawa ............ H04N 7/0132
348/441
2016/0293089 A1\* 10/2016 Hung .................... G09G 3/2018
2018/0240100 A1\* 8/2018 Leleu ........................ G09C 1/00

\* cited by examiner

IMAGE DISPLAYING SYSTEM AND IMAGE DISPLAYING METHOD APPLIED THERETO

FIELD OF THE INVENTION

The present invention relates to an image displaying system and an image displaying method, and more particularly to a system and a method for solving an image sticking problem or an image retention phenomenon in an existing liquid crystal displaying technology.

BACKGROUND OF THE INVENTION

An image displaying device such as a general television or a general display device has been widely used. Recently, it is an important issue to improve the quality of the image frame in order to develop the image displaying technology. With increasing development of science and technology, the image displaying device is gradually developed from the early cathode ray tube display to the today's liquid crystal display (LCD). Nowadays, since the basic image displaying quality is significantly improved and the overall volume of the image displaying device is reduced, the applications of the displaying technology are broadened. However, the LCD displaying technology still has some drawbacks.

As known, the liquid crystal molecule itself is not luminous. Consequently, the LCD display uses a backlights module (e.g., LED) as a light source and controls the liquid crystal arrangement of the liquid crystal panel to produce the illuminated image.

Generally, the liquid crystal panel is light-transmissible, and the liquid crystal molecules are arranged in an array. When the liquid crystal molecules are operated under the polarizing plate, the combination of the brightness and the corresponding color exhibits the image contents (e.g., characters or symbols). Moreover, as the voltage applied to the polarizing plate is controlled, the polarity of the liquid crystal molecules is correspondingly changed. Consequently, the arrangement of the liquid crystal molecules is adjusted. Since the liquid crystal molecules are correspondingly rotated, the transmittance of the light beam from the backlight source is changed.

Regardless of the materials, operating environments or the use practices of the LCD screen, the voltage between the two electrodes of the polarizing plate is subjected to a tiny change after the image shown on the LCD screen has been kept unchanged for a certain time period. Generally, as the time period of showing the same image frame on the LCD screen is increased, the charges retained between the two electrodes result in the gradual accumulation of the voltage. Under this circumstance, the liquid crystal molecules are suffered from variation. Due to the variation, an image sticking problem occurs. For example, after the screen content is refreshed to generate a new frame, a portion of the old content of the original image frame is also shown on the screen.

Normally, in case that the image is continuously changed, the image sticking problem is not generated. However, in some situations, a specified image frame has to be shown on the screen for a long time. For example, the industrial monitoring message, the news channel logo or the medical workstation bed message needs to be shown on the screen for a long time.

For solving the image sticking problem, it is necessary to effectively release the accumulated voltage between the two electrodes. Conventionally, some approaches are disclosed to solve the image sticking problem. In accordance with a conventional approach, the same image frame is not shown on the screen for a long time. In accordance with another conventional approach, the frame shown on the screen is automatically switched after a specified time interval. For example, a screen saver program is executed. In accordance with another conventional approach, the circuitry layer is designed to dynamically adjust the voltage or adjust the discharging time sequence in order to release the residual charges quickly. In accordance with another conventional approach, the manufacturing process and the material of the liquid crystal panel are improved.

However, the associated applications (e.g., the above approaches) still have some drawbacks. For example, in some approaches, the image block to be maintained for a long time is possibly interfered by a meaningless frame. Moreover, the improvement in the hardware component increases the fabricating and searching cost. Therefore, the conventional displaying technology needs to be further improved.

SUMMARY OF THE INVENTION

For solving the drawbacks of the conventional technologies, the present invention provides an image displaying system and an image displaying method. In accordance with the present invention, the displayed content on the screen is changed in a very short time. Consequently, the image sticking problem or the image retention phenomenon in an existing liquid crystal displaying technology can be effectively overcome. Moreover, because of the human persistence of vision, the monitored image can be continuously retained on the screen.

In accordance with an aspect of the present invention, there is provided an image displaying method for an image displaying system. The image displaying system includes a liquid crystal screen with a display area. The image displaying method includes the following steps. Firstly, the image displaying system receives an image signal. Consequently, an original frame corresponding to the image signal is shown on the display area at a first time point. Then, an adjusted image is shown on the display area at a second point according to a setting information. The adjusted image and the original frame have different contents. Then, the adjusted image is not shown but the original frame is shown on the display area at a third time point. The time difference between the third time point and the first time point is not larger than a response time period corresponding to the human persistence of vision.

In an embodiment, when a firmware installed in the image displaying system or an application program stored in a flash memory of the image displaying system is executed, the image displaying method is performed.

In an embodiment, the image displaying system further includes a user interface and an electrically erasable programmable read-only memory. Moreover, the image displaying method further includes steps of generating the setting information through the user interface and storing the setting information into the electrically erasable programmable read-only memory. The setting information contains a resolution setting information about the display area, a displaying setting information about the adjusted image and a constituent setting information about the adjusted image.

In an embodiment, the image displaying system further includes a dynamic random access memory, and the image displaying method further includes a step of storing the original frame into the dynamic random access memory.

In an embodiment, the image displaying system further includes a database, and the adjusted image is composed of one or plural adjusted patterns, wherein the one or plural adjusted patterns are stored in the database so as to be accessed.

In an embodiment, each of the adjusted patterns corresponds to one or plural display units of the liquid crystal screen.

In an embodiment, the adjusted image is completely shown on the display area after the original image is replaced by the one or plural adjusted patterns, or the one or plural adjusted patterns and the original frame are combined together and simultaneously shown on the display area according to an on screen display setting.

In an embodiment, wherein the plural adjusted patterns are sequentially shown on the display area along a predetermined displaying direction, or the one or plural adjusted patterns are randomly shown on the display area.

In an embodiment, the image displaying system further includes an image processor, and the image displaying method further includes the steps of accessing the corresponding adjusted patterns from the database, analyzing the adjusted patterns and processing the adjusted patterns according to the setting information, and combining the adjusted patterns as the adjusted image through an adjusting library after the adjusted patterns are processed.

In an embodiment, the original frame shown on the display area is processed by the image processor through an original library.

In accordance with another aspect of the present invention, there is provided an image displaying system. The image displaying system includes a signal input terminal and a liquid crystal screen. The signal input terminal receives an image signal. The liquid crystal screen includes a display area. An original frame corresponding to the image signal is shown on the display area at a first time point. An adjusted image is shown on the display area at a second point according to a setting information. The adjusted image is not shown on display area but the original frame on the display area at a third time point. The adjusted image and the original frame have different contents. The time difference between the third time point and the first time point is not larger than a response time period corresponding to the human persistence of vision.

In an embodiment, the image displaying system further includes a user interface and an electrically erasable programmable read-only memory. The setting information is generated through the user interface. The setting information is stored in the electrically erasable programmable read-only memory. The setting information contains a resolution setting information about the display area, a displaying setting information about the adjusted image and a constituent setting information about the adjusted image.

In an embodiment, the image displaying system further includes a dynamic random access memory, and the original frame is stored in the dynamic random access memory.

In an embodiment, the image displaying system further includes a database, and the adjusted image is composed of one or plural adjusted patterns, wherein the one or plural adjusted patterns are stored in the database so as to be accessed.

In an embodiment, each of the adjusted patterns corresponds to one or plural display units of the liquid crystal screen.

In an embodiment, the adjusted image is completely shown on the display area after the original image is replaced by the one or plural adjusted patterns, or the one or plural adjusted patterns and the original frame are combined together and simultaneously shown on the display area according to an on screen display setting.

In an embodiment, the plural adjusted patterns are sequentially shown on the display area along a predetermined displaying direction, or the one or plural adjusted patterns are randomly shown on the display area.

In an embodiment, the image displaying system further includes an image processor. The image processor analyzes the corresponding adjusted patterns from the database, processes the adjusted patterns according to the setting information, and combines the adjusted patterns as the adjusted image through an adjusting library after the adjusted patterns are processed.

In an embodiment, the original frame shown on the display area is processed by the image processor through an original library.

From the above descriptions, the present invention provides an image displaying system and an image displaying method. In accordance with the present invention, the contents shown on the liquid crystal screen are changed in a very short time. Since the liquid crystal molecules are rotated to release the accumulated voltage, the image sticking problem or the image retention phenomenon in the existing liquid crystal displaying technology is overcome. Especially when a specified image frame has to be shown on the screen for a long time, the technology of the present invention can provide good adjusting efficacy. Moreover, the original frame can be normally monitored by the user without interference. Moreover, the pattern with protection and declaration can be embedded in the screen in a very short time that is not perceived by the human eye.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
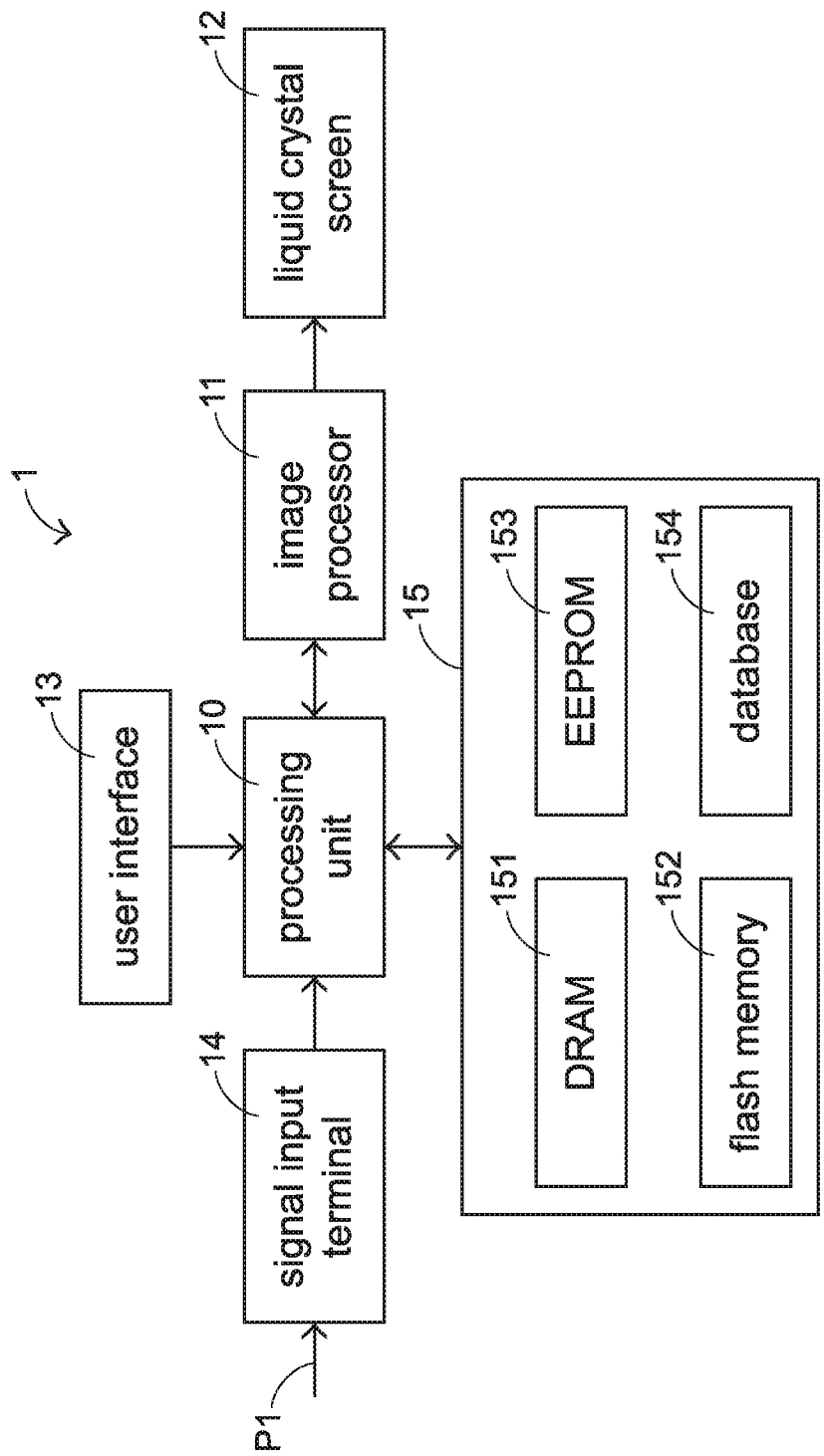
FIG. 1 is a schematic functional diagram illustrating an image displaying system according to a first embodiment of the present invention.

An image displaying system and an image displaying method according to a first embodiment of the present invention will be described as follows. FIG. 1 is a schematic functional diagram illustrating an image displaying system according to a first embodiment of the present invention. As shown in FIG. 1, the image displaying system 1 comprises a central processing unit 10, a signal input terminal 14, a liquid crystal screen 12, an image processor 11, a user interface 13 and a storage medium 15. The signal input terminal 14 is used to receive an image signal P1. For example, the image signal P1 is an operational content signal from an industrial monitor or a workstation. In this embodiment, the signal is an image signal, and the image signal is related to an image frame that is kept unchanged for a long time. In some other embodiments, the signal contains both of an image signal and an audio signal.

Figure 3A:
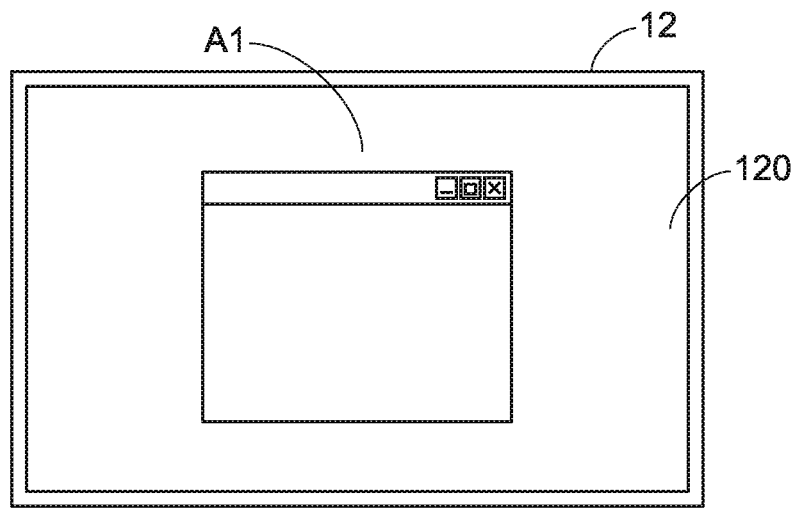
FIGS. 3A, 3B and 3C schematically illustrate the consecutive frames shown on the display area of the liquid crystal screen in response to image adjustment according to the first embodiment of the present invention.

The liquid crystal screen 12 comprises a display area 120 (see FIG. 3A). The contents corresponding to the image signal P1 are shown on the display area 120. Via the user interface 13, the user may perform the operations and make associated settings to implement the image displaying method of the present invention. In case that the user interface 13 is applied to a general monitor or a general image displaying device, the user interface 13 is a remote controller or an operation panel that is installed in the monitor or the image displaying device. The remote controller or the operation panel comprises plural keys. Via the keys, the settings of different functions and operations can be made.

The storage medium 15 has the function of storing and recording data. According to the type, the storage medium 15 comprises a dynamic random access memory (DRAM) 151, a flash memory 152 and an electrically erasable programmable read-only memory (EEPROM) 153. When a firmware (not shown) installed in the image displaying system 1 or an application program stored in the flash memory 152 of the image displaying system 1 is executed, the image displaying method of the present invention is performed. While the image signal P1 is outputted, the frame corresponding to the streaming data of the image signal P1 (e.g., an original frame) is stored in the DRAM 151. The above results set by the user are stored in the EEPROM 153.

It is noted that the examples of the memories in the storage medium 15 are not restricted. That is, the memories in the storage medium 15 may be varied according to the practical requirements. The application program is a resident program. After the image displaying system 1 is booted, the application program starts to be executed. Consequently, the information associated with the settings is continuously stored in the storage medium. Even if the image displaying system 1 is powered off, the information associated with the settings does not disappear. Moreover, the execution of the application program allows the image signal P1 to be normally outputted while performing the designated adjustment corresponding to the additional image processing operation.

The central processing unit 10 is responsible for the accessing links, the signal processing operations and the signal receiving operations between all functional components. Moreover, the storage medium 15 of the image displaying system 1 further comprises a database 154. The memory of the database 154 is not restricted. For example, the memory of any of the above types is feasible. The data or pictures for image adjustment are stored into and accessible to the database 154. Moreover, these data or pictures are set by the user through the user interface 13 according to the practical requirements.

Figure 2:
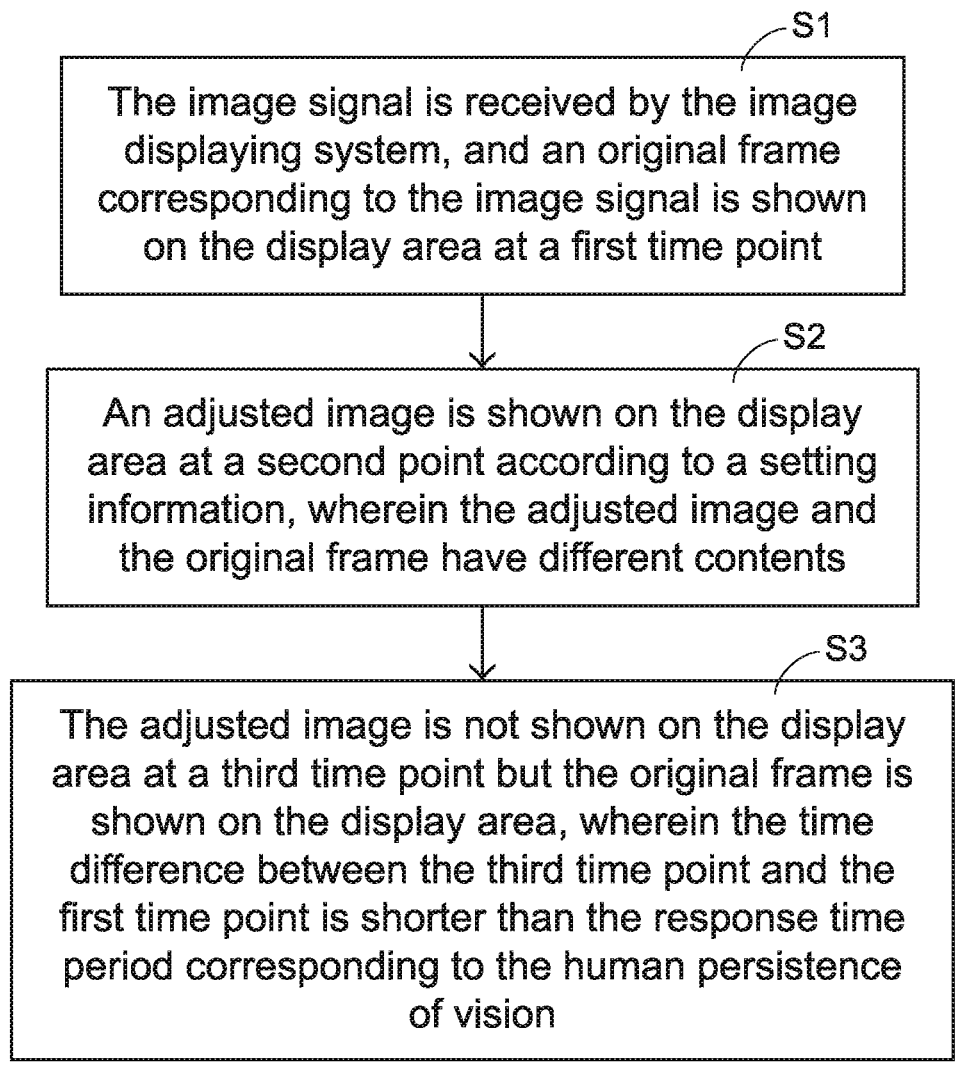
FIG. 2 is a flowchart illustrating an image displaying method for the image displaying device according to the first embodiment of the present invention.
Figure 3B:
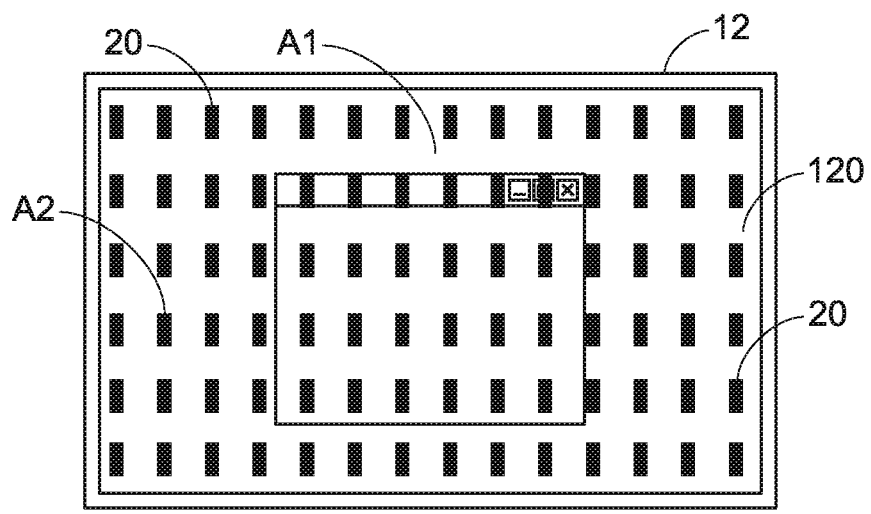
Figure 3C:
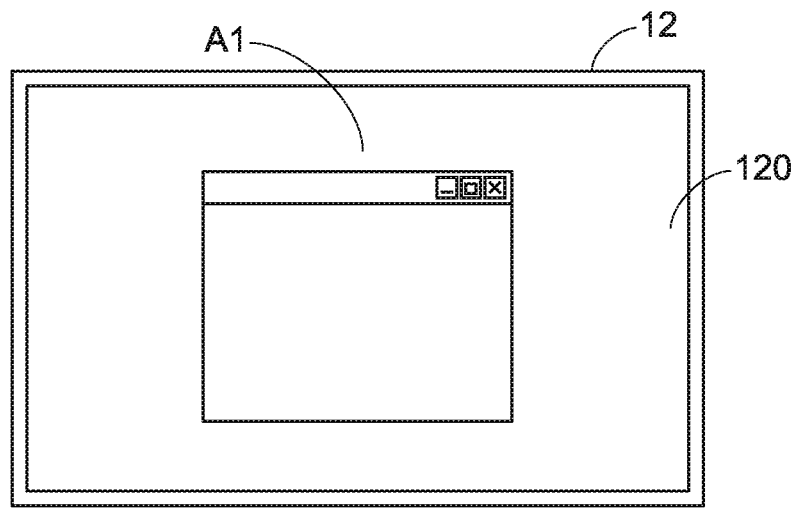

FIG. 2 is a flowchart illustrating an image displaying method for the image displaying system according to the first embodiment of the present invention. FIGS. 3A, 3B and 3C schematically illustrate the consecutive frames shown on the display area of the liquid crystal screen in response to image adjustment according to the first embodiment of the present invention.

Firstly, the image signal P1 is received by the image displaying system, and an original frame A1 corresponding to the image signal P1 is shown on the display area 120 at a first time point (Step S1). Then, an adjusted image A2 is shown on the display area 120 at a second point according to a setting information (Step S2). The adjusted image A2 and the original frame A1 have different contents. Then, the adjusted image A2 is not shown on the display area 120 but the original frame A1 is shown on the display area 120 at a third time point (Step S3). The time difference between the third time point and the first time point is not larger than the response time period corresponding to the human persistence of vision.

Please refer to FIG. 3A. In the step S1, the image signal P1 is continuously received by the signal input terminal 14 and sequentially and temporarily stored into the DRAM 151. In an embodiment, the original frame A1 corresponding to the image signal P1 is a frame whose content has been just refreshed. Alternatively, the original frame A1 corresponding to the image signal P1 is a frame whose content has not been refreshed for a long time. Since the technology of the present invention is used to solve the image sticking problem, the original frame A1 is an image frame that has been kept unchanged for a long time period (e.g., 10 minutes) before the first time point. In this embodiment, the image processor 11 analyzes whether the content of the original frame A1 is kept unchanged. The analyzed result of the image processor 11 is helpful for the subsequent automatic judgment.

Please refer to FIG. 3B again. In the step S2, the adjusted image A2 is composed of plural adjusted patterns 20. These adjusted patterns 20 have the same size. Moreover, each adjusted pattern 20 corresponds to plural display units (not shown) of the liquid crystal screen 12. That is, each adjusted pattern 20 is equivalent to plural display units that are representative of the resolution of the liquid crystal screen 12.

The size of each display unit of the liquid crystal screen 12 is very small with respect to the human eye. For allowing the constituent contents of the adjusted image A2 to be distributed over the entire of the display area 120, the adjusted image A2 should be specially designed. Preferably, each adjusted pattern 20 is equivalent to plural display units of the liquid crystal screen 12, and the content of each adjusted pattern 20 is different from the contents of the corresponding display units of the original frame A1. For example, the gray levels are different. Consequently, all of the adjusted patterns 20 are uniformly distributed on the display area 120. Under this circumstance, the liquid crystal molecules are subjected to a rotational change, and the accumulated voltage is released. Consequently, the image stick problem is solved.

Alternatively, in another embodiment, each adjusted pattern is equivalent to one display unit of the liquid crystal screen 12. That is, the size of the adjusted pattern is equal to the size of the display unit of the liquid crystal screen 12. However, in case that the solution of the adjusted image A2 is increased, the time period of completing the entire of the adjusted image A2 is extended.

In another embodiment, the adjusted patterns of the adjusted image have different sizes. In another embodiment, the entire of the adjusted image is substantially composed of one adjusted pattern. That is, the size of the adjusted pattern is equal to the size of the entire of the adjusted image and distributed in the whole display area 120. In another embodiment, the constituent and the displaying way of the original frame A1 are completely replaced by those of the adjusted pattern of the adjusted image, and the adjusted pattern of the adjusted image is shown on the entire of the display area 120.

Please refer to FIG. 3B again. For displaying the adjusted image A2, portions of the adjusted patterns 20 are shown on the display area 120. In addition, the portions of the adjusted patterns 20 and the original frame A1 are combined together and simultaneously shown on the display area 120 according to an on screen display (OSD) setting. That is, in the step S2, the display area 120 is not completely occupied by the adjusted image A2 at the second time point and a portion of the original frame A1 is still shown on the display area 120.

In an embodiment, the plural adjusted patterns 20 of the adjusted image A2 are sequentially shown on the display area 120 along a predetermined displaying direction. For example, the plural adjusted patterns 20 are sequentially shown on the display area 120 from the left side to the right side and from the top side to the bottom side. Like the general scanning technology, plural scan lines are horizontally scanned from the left side to the right side and vertically scanned from the top side to the bottom side. In such way, the adjusted image A2 is produced.

The formation of the adjusted image A2 is related to the scanning speed. The second time point is the time point when the adjusted image A2 is formed. In other words, the time point of starting to scan the adjusted image A2 and the time point of forming the adjusted image A2 are between the first time point and the second time point. However, the adjusted image A2 is formed at a fast scanning speed that is not perceived by the human eye.

The setting information contains the resolution setting information about the display area 120 (i.e., the displaying resolution information about the original frame A1), the displaying setting information about the adjusted image A2, the constituent setting information about the adjusted image A2, an so on. The displaying setting about the adjusted image A2 includes the on screen display (OSD) setting information, the sequential displaying information or the random displaying information, which will be described later. The constituent setting information about the adjusted image A2 is the setting information about the adjusted patterns 20. The user may set and generate the above setting information through the user interface 13. The setting information may be stored in the EEPROM 153.

As mentioned above, the adjusted image A2 is shown according to the setting information. In addition, the method of displaying the adjusted image A2 is controlled by the image processor 11. The displaying method of the first embodiment comprises the following steps. Firstly, the central processing unit 10 accesses one or plural adjusted patterns 20 from the database 154. Then, the image processor 11 analyzes the adjusted patterns 20 and processes the adjusted patterns 20 according to the setting information. For example, the image processing operation performed by the image processor 11 includes an image filtering operation, an image degrading operation, an analyzing operation, and so on. After the image processing operation is completed, the adjusted patterns 20 are combined as the adjusted image A2 by an adjusting library.

The adjusting library is a library for the on screen display (OSD) setting. Moreover, the adjusting library is a compile file that is executed by a specified program. According to the display specification of the corresponding hardware component (e.g., the liquid crystal screen 12), the analyzed and processed data are combined as the adjusted image A2 by the adjusting library and shown on the hardware component.

For example, one or plural adjusted patterns are stored in the database 154. The adjusted patterns may have different contents (e.g., sizes or gray levels). Consequently, the adjusted patterns can be accessed and combined as the adjusted image A2. For resulting in the rotation of the liquid crystal molecules, the contents of the adjusted image A2 and the contents of the corresponding display units of the original frame A1 (e.g., the gray levels) have to be different. Since the adjusted patterns 20 are analyzed and processed by the image processor 11, the suitable adjusted patterns 20 are placed on the display area by the adjusting library according to the contents of the corresponding display units of the original frame A1. In such way, the accumulated voltage between the two electrodes of the corresponding positions is released.

From the above descriptions, the generation of the adjusted image A2 can overcome the image sticking problem after the liquid crystal molecules are subjected to a rotational change. In other words, the time period of generating the adjusted image A2 is not too long.

Please refer to FIG. 3C again. In the step S3, the adjusted image A2 is not shown on the display area 120 but the original frame A1 is shown on the display area 120 at the third time point. That is, the situation of FIG. 3A is returned. The formation of the adjusted image A2 is not perceived by the human eye. The time difference between the third time point and the first time point is very short. Particularly, the time difference between the third time point and the first time point is smaller than or equal to (i.e., not larger than) the response time period corresponding to the human persistence of vision. If the switching speed corresponding to the time difference between the third time point and the first time point is faster than the response speed corresponding to the human persistence of vision, the image displaying system 1 can overcome the image sticking problem. Moreover, the formation of the adjusted image A2 is not perceived by the user. Due to human persistence of vision, the original frame A1 can be normally monitored by the user without interference. In other words, the image sticking problem can be effectively solved.

As mentioned above, portions of the adjusted patterns 20 and the original frame A1 are simultaneously shown on the display area 120 according to an the screen display (OSD) setting. For allowing the original frame A1 to be completely shown on the display area 120, the portion of the original frame A1 unsheltered by the adjusted image A2 is continuously shown and the portion of the original frame A1 sheltered by the adjusted image A2 is shown again.

In the above embodiment, the image processor 11 is responsible for showing the original frame A1. Particularly, an original library other than the adjusting library is responsible for showing the original frame A1 on the display area 120. The original frame A1 and the adjusted image A2 are obtained from different image sources. However, both of the original frame A1 and the adjusted image A2 are shown on the same display area 120. For example, the data are written into the same frame buffer. Since the image sources are different, the original library is responsible for showing the original frame A1 on the display area 120 in the time interval from the first time point to the third time point.

It is noted that the steps S2 and S3 are repeatedly done. That is, after the original frame A1 is shown again or the original frame A1 has been refreshed for a long time, the similar adjusted image is shown again according to the setting. The way of showing the new adjusted image may be similar to that of the first embodiment. Alternatively, in another embodiment, the way of showing the new adjusted image is different. For example, the adjusted patterns are randomly shown on the display area to solve the image sticking problem. In other words, the first embodiment may be further modified.

Figure 4:
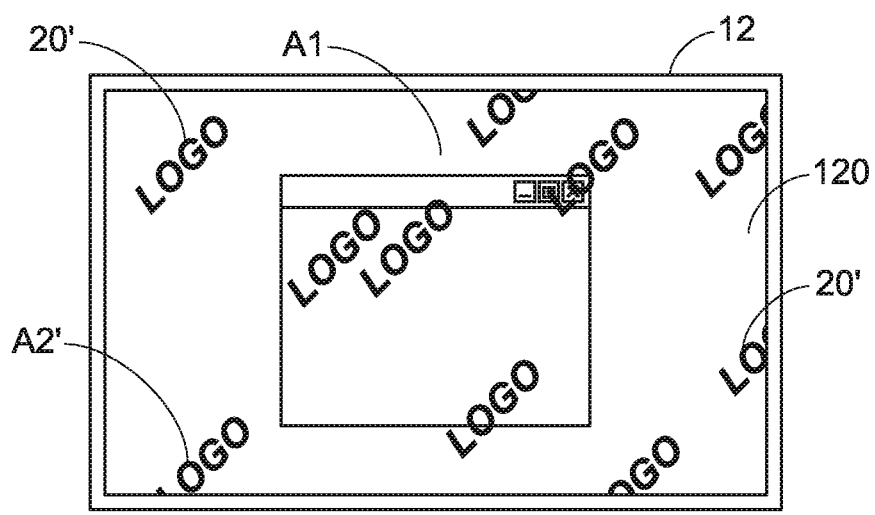
FIG. 4 schematically illustrates the original frame and the adjusted image shown on the display area of the liquid crystal screen in response to image adjustment according to a second embodiment of the present invention.

An image displaying method according to a second embodiment of the present invention will be described as follows. FIG. 4 schematically illustrates the original frame and the adjusted image shown on the display area of the liquid crystal screen in response to image adjustment according to a second embodiment of the present invention. The hardware setting and the image displaying method of this embodiment are similar to those of the first embodiment.

The steps S1 and S3 and the descriptions of FIGS. 3A and 3C are similar to those of the first embodiment, and are not redundantly described herein. In comparison with the first embodiment, the way of showing the adjusted image A2' in this embodiment is distinguished. As shown in FIG. 4, plural adjusted patterns 20' are randomly shown on the display area 120. In other words, FIG. 4 indicates the step S2 of the image displaying method.

In this embodiment, the adjusted image A2' is composed of plural adjusted patterns 20'. For clarification, the adjusted patterns 20' have the same size and the same type. For example, each adjusted pattern 20' is a watermark or a trade mark. That is, the adjusted pattern 20' contains the text content and the picture content. Preferably, the adjusted patterns 20' are previously stored in the database 154 by the user. Consequently, the adjusted patterns 20' are accessible from the database 154. Similarly, the size of each adjusted pattern 20' corresponds to plural display units of the liquid crystal screen 12.

In this embodiment, the adjusted patterns are randomly shown. The following two aspects should be specially described. Firstly, the distances between the adjacent adjusted patterns 20' are not constant or these adjusted patterns 20' are asymmetric. Secondly, the positions of these adjusted patterns 20' are determined by the adjusting library in a specified manner (e.g., according to a random number). Alternatively, the number of the adjusted patterns 20' and the positions of the adjusted patterns 20' may be randomly determined at each time. In other words, the adjusted image is possibly composed of one adjusted pattern.

Similarly, portions of the adjusted patterns 20' of the adjusted image A2' and the original frame A1 are combined together and simultaneously shown on the display area 120 according to a screen display (OSD) setting. For resulting in the rotation of the liquid crystal molecules to solve the image sticking problem, the constituent contents of the adjusted image A2' (i.e., the adjusted patterns 20') generated by the adjusting library and the contents of the corresponding display units of the original frame A1 (e.g., the gray levels) have to be different.

Moreover, the formation of the adjusted image A2' is not perceived by the user. Due to human persistence of vision, the original frame A1 can be normally monitored by the user without interference. Moreover, in case that the adjusted pattern 20' is the watermark or the trade mark, an additional special displaying function can be provided. For example, since the adjusted pattern 20' is combined with the original frame A1 in a very short time that is not perceived by the human eye, the efficacy of declaring confidentiality or right can be achieved. For example, if someone wants to use an image pickup device to shoot the content of the displayed frame, the adjusted image A2' can provides a protecting effect to prevent the entire of the important content to be captured. Moreover, the formation of the adjusted image A2' can help the user find out whether the image frame is stolen.

In some other embodiments, the adjusted image is composed of plural different adjusted patterns and plural identical adjusted patterns, wherein the positions of the adjusted patterns are determined by the adjusted library. For example, some adjusted patterns contain the picture contents, but the other adjusted patterns contain the text contents only. These adjusted patterns are stored in the database 154 so as to be accessed. In case that the adjusted image is composed of plural different adjusted patterns, each adjusted pattern has to be stored in the database 154.

Similarly, the steps S2 and S3 as shown in FIG. 2 can be repeatedly done. Since the adjusted patterns 20' are randomly shown on the display area, the positions, the numbers or sizes of the adjusted patterns 20' may be varied according to the practical requirements. Since all of the display units corresponding to the original frame A1 are possibly adjusted, the efficacy of eliminating the image sticking problem is enhanced.

From the above descriptions, the present invention provides an image displaying system and an image displaying method. The technology of the present invention can be used to solve the drawbacks of the conventional liquid crystal displaying technology. Especially when a specified image frame has to be shown on the screen for a long time, the technology of the present invention can provide good adjusting efficacy. In accordance with the present invention, the contents shown on the liquid crystal screen are changed in a very short time. Since the liquid crystal molecules are rotated to release the accumulated voltage, the image sticking problem is overcome. Moreover, since the adjusted pattern is embedded in the display area in a very short time that is not perceived by the human eye, the efficacy of declaring confidentiality or right can be achieved.

As mentioned above, the original frame can be normally monitored by the user without interference. Moreover, since the image displaying method of the present invention is implemented through execution of a software program, the cost associated with the hardware component is reduced. Moreover, in case that the image displaying method of the present invention is automatically implemented, the monitoring loading on the user is largely reduced. For example, after the original frame has been shown for ten minutes, the image displaying method of the present invention is automatically implemented.

Therefore, the present invention can effectively solve the drawbacks of the conventional technology while achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image displaying method executed by an image displaying system, the image displaying system comprising a liquid crystal screen defined with a display area, the image displaying method comprising steps of:
   receiving an image signal and showing an original frame corresponding to the image signal on the display area at a first time point;

showing an adjusted image on the display area at a second point subsequent to the first time point according to a setting information, wherein the adjusted image and the original frame have different contents; and stopping showing the adjusted image but showing the original frame on the display area at a third time point subsequent to the second time point, wherein a time difference between the third time point and the first time point is not larger than a response time period corresponding to the human persistence of vision so that the adjusted image cannot be visibly perceived.

2. The image displaying method according to claim 1, wherein when a firmware installed in the image displaying system or an application program stored in a flash memory of the image displaying system is executed, the image displaying method is performed.

3. The image displaying method according to claim 1, wherein the image displaying system further comprises a user interface and an electrically erasable programmable read-only memory, and the image displaying method further comprises steps of:

generating the setting information through the user interface; and storing the setting information into the electrically erasable programmable read-only memory, wherein the setting information includes a resolution setting information about the liquid crystal screen for determining a resolution of the display area, a displaying setting information about the adjusted image for determining a displayed way of the adjusted image, and a constituent setting information about the adjusted image for determining contents of the adjusted image.

4. The image displaying method according to claim 3, wherein the image displaying system further comprises a database, and information of one or plural adjusted patterns are stored in the database to be accessed as the constituent setting information of the setting information.

5. The image displaying method according to claim 4, wherein each of the adjusted patterns corresponds to one or plural display units of the liquid crystal screen.

6. The image displaying method according to claim 4, wherein the adjusted image is shown on the display area at the second time point by showing only the one or plural adjusted patterns on the display area, or simultaneously showing the one or plural adjusted patterns together with the original frame on the display area according to the displaying setting information of the setting information.

7. The image displaying method according to claim 4, wherein the plural adjusted patterns are sequentially shown on the display area along a predetermined displaying direction, or the one or plural adjusted patterns are randomly shown on the display area according to the displaying setting information of the setting information.

8. The image displaying method according to claim 4, wherein the image displaying system further comprises an image processor, and the image displaying method further comprises following steps executed by the image processor:

receiving specified patterns for forming the adjusted image from the database;

analyzing the specified patterns and processing images of the specified patterns to form the adjusted patterns according to the setting information; and combining the adjusted patterns to form the adjusted image through an adjusting library.

9. The image displaying method according to claim 8, wherein the original frame shown on the display area is processed by the image processor through an original library.

10. The image displaying method according to claim 1, wherein the image displaying system further comprises a dynamic random access memory, and the image displaying method further comprises a step of storing the original frame into the dynamic random access memory.

11. An image displaying system, comprising:

a signal input terminal receiving an image signal; and a liquid crystal screen defined with a display area, wherein an original frame corresponding to the image signal is shown on the display area at a first time point, an adjusted image is shown on the display area at a second point subsequent to the first time point according to a setting information, and the original frame is shown on the display area again instead of the adjusted image at a third time point subsequent to the second time point, wherein the adjusted image and the original frame have different contents, and a time difference between the third time point and the first time point is not larger than a response time period corresponding to the human persistence of vision so that the adjusted image cannot be visibly perceived.

12. The image displaying system according to claim 11, wherein the image displaying system further comprises a user interface and an electrically erasable programmable read-only memory, wherein the setting information is generated through the user interface, and the setting information is stored in the electrically erasable programmable read-only memory, wherein the setting information includes a resolution setting information about the liquid crystal screen for determining a resolution of the display area, a displaying setting information about the adjusted image for determining a displayed way of the adjusted image, and a constituent setting information about the adjusted image for determining contents of the adjusted image.

13. The image displaying system according to claim 12, wherein the image displaying system further comprises a database, and information of one or plural adjusted patterns are stored in the database to be accessed as the constituent setting information of the setting information.

14. The image displaying system according to claim 13, wherein each of the adjusted patterns corresponds to one or plural display units of the liquid crystal screen.

15. The image displaying system according to claim 13, wherein the adjusted image is shown on the display area at the second time point by showing only the one or plural adjusted patterns on the display area, or simultaneously showing the one or plural adjusted patterns together with the original frame on the display area according to the displaying setting information of the setting information.

16. The image displaying system according to claim 13, wherein the plural adjusted patterns are sequentially shown on the display area along a predetermined displaying direction, or the one or plural adjusted patterns are randomly shown on the display area according to the displaying setting information of the setting information.

17. The image displaying system according to claim 13, further comprising an image processor, wherein the image processor analyzes specified patterns from the database, processes images of the specified patterns to form the adjusted patterns according to the setting information, and combines the adjusted patterns to form the adjusted image through an adjusting library after the adjusted patterns are processed.

18. The image displaying system according to claim 17, wherein the original frame shown on the display area is processed by the image processor through an original library.

19. The image displaying system according to claim 11, wherein the image displaying system further comprises a dynamic random access memory, and the original frame is stored in the dynamic random access memory.

* * * * *